Oct. 18, 1966         J. ABEGGLEN         3,279,583
LINE CHANGER FOR A ROLLER-TYPE CONVEYOR PLANT
Filed Feb. 25, 1964                                3 Sheets-Sheet 1

Inventor
Jean Abegglen
By
Watson Cole Grindle & Watson
Attys.

Oct. 18, 1966  J. ABEGGLEN  3,279,583
LINE CHANGER FOR A ROLLER-TYPE CONVEYOR PLANT
Filed Feb. 25, 1964  3 Sheets-Sheet 2

Inventor
Jean Abegglen
By
Watson, Cole, Grindle & Watson
Attys.

Oct. 18, 1966 J. ABEGGLEN 3,279,583
LINE CHANGER FOR A ROLLER-TYPE CONVEYOR PLANT
Filed Feb. 25, 1964 3 Sheets-Sheet 3

Inventor
Jean Abegglen
By
Watson Cole Grindle + Watson
Attys.

3,279,583
LINE CHANGER FOR A ROLLER-TYPE CONVEYOR PLANT
Jean Abegglen, 10 Rue du Magistrat, Brussels, Belgium
Filed Feb. 25, 1964, Ser. No. 347,236
Claims priority, application Switzerland, Mar. 25, 1963, 3,784/63
2 Claims. (Cl. 198—38)

This invention relates to a line changer for a roller-type conveyer plant. The line changer according to the invention is principally characterized in that for each of the branched conveyer tracks there is provided an independent set of rollers, and that the rollers of at least one of the sets are individually and consecutively raisable into a working position and lowerable into an idle position of rest by a substantially vertical movement relative to the rollers of the other sets.

Preferably, each of the substantially vertically movable rollers has associated therewith an electromagnetic, pneumatic or hydraulic actuating mechanism which, except for the roller coming first into contact with the articles, are operated automatically and with delayed action by the change in position of the next forward roller in the set both when the rollers are being raised and when they are being lowered.

Further features and details of the invention will appear from the following specification and claims, taken in conjunction with the accompanying drawing wherein there is shown, purely by way of example, one preferred embodiment of the invention.

Figure 1:
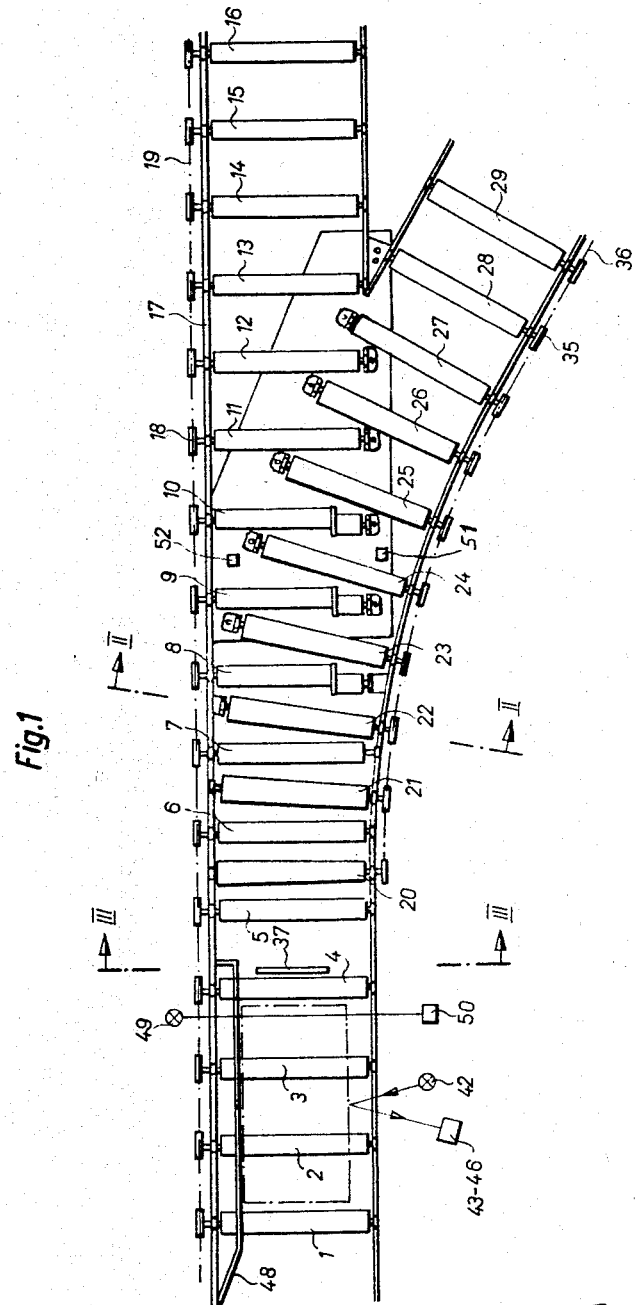
FIG. 1 shows diagrammatically a top plan view of a diverging line changer for a roller-type conveyer plant.

Referring more particularly to FIG. 1, the line changer shown comprises a number of cylindrical rollers 1–16 arranged parallel one behind the other, forming a straight conveyer track for articles, such as boxes, packages, etc. The spindles of rollers 1–16 are journalled in fixed bearings on a frame 17 of the track and are each provided at one end with a sprocket wheel 18. An endless driving chain 19 runs over the sprockets 18 of all rollers 1–18 and is driven by a motor (not shown).

For forming a branched curved conveyer track, in the spaces between the cylindrical rollers 5–12 there is arranged a number of tapered rollers 20–26 in such a way, that their spindles are substantially radially aligned with respect to the center of curvature of the curved track. Starting from the beginning of the line changer, i.e. from the place, where the straight and the curved tracks start to branch off, the spindles of the tapered rollers 20–26 are increasingly inclined with respect to the cylindrical rollers. The last tapered roller 26 has adjoining thereto a number of additional cylindrical rollers 27–29.

Figure 2:
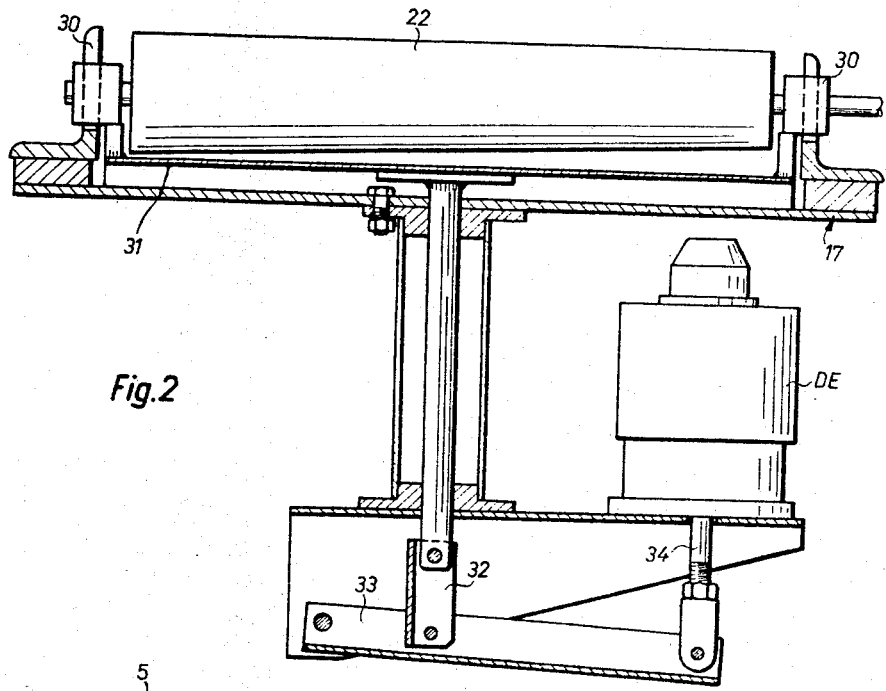
FIGS. 2 and 3 show each on a larger scale a vertical section on the line II—II and III—III respectively of FIG. 1 in the direction of the arrows.

In contradistinction to the cylindrical rollers 1–16 of the straight track and the cylindrical rollers 27–29 of the curved track, the tapered rollers 20–26 are movably arranged in a substantially vertical direction so that they can selectively be raised either into their working position or into an idle position of rest. In their raised position the topmost peripheral lines of the tapered rollers 20–26 are a little higher than the topmost peripheral lines of the cylindrical rollers 5–12. The reverse is the case, if the tapered rollers take up their idle position of rest. The spindle of each tapered roller is journalled in vertically displaceable bearings 30 which, according to FIG. 2, are carried on an upwardly and downwardly movable mounting 31. The lower end of a vertical shaft of mounting 31 is connected to a one-armed lever 33 by means of a plate 32, which lever is pivotally supported on frame 17 of the line changer and connected to the armature 34 of an electromagnet DE mounted on frame 17. The electromagnet DE serves as an actuating means for raising the associated roller; the roller is lowered by gravity upon deenergizing the electromagnet. Each vertically movable roller has associated therewith an independent electromagnet. In the circuit diagram according to FIG. 4 said electromagnets are designated $DE_I$–$DE_{II}$; except for the last magnet, they have each one electric switch $de_I \ldots de_{VI}$, shown in the circuit diagram only, which switch is closed upon attraction of the respective magnet armature.

The spindles of the vertically movable rollers 20–26 each carry a V-belt pulley 35. An endless V-belt 36 runs over all pulleys 35 and is driven by a motor (not shown).

Figure 3:
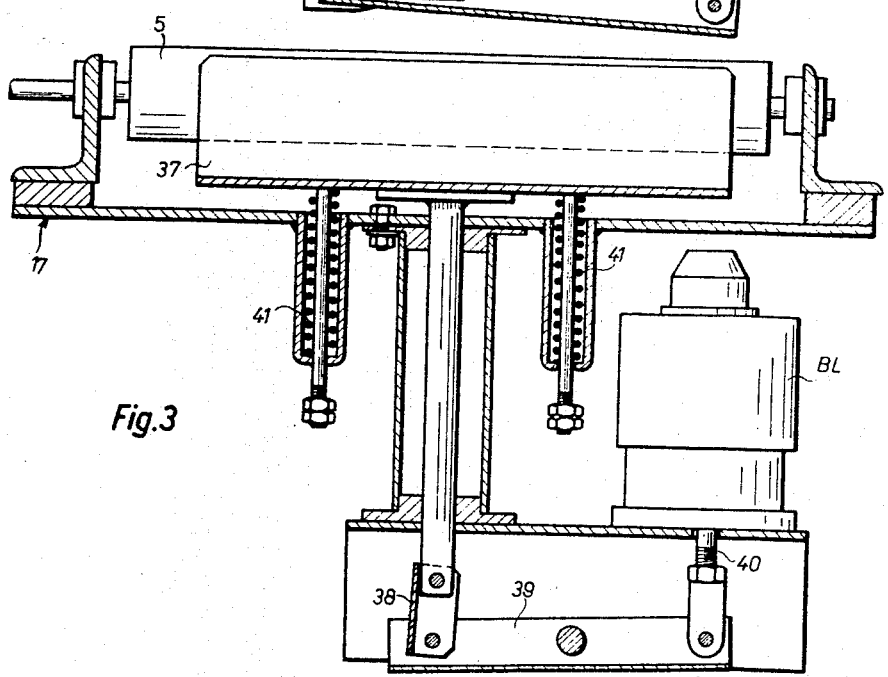

At the beginning of the line changer there is a blocking device 37 arranged for vertical movement between the two rollers 4 and 5. According to FIG. 3 said blocking device includes a vertical shaft whose bottom end is coupled to one arm of a two-armed lever 39 by means of a plate 38. Said lever is pivotally supported by frame 17 of the line changer, its other arm being connected to the armature 40 of an electromagnet BL mounted on frame 17. The blocking device 37 is under the action of springs 41 which tend to raise it until its top edge projects into the path of the articles arriving on rollers 1–4, thus preventing them from moving on. However, by means of electromagnet BL the blocking device 37 can be moved downwards and be entirely retracted from the path of the articles being conveyed. Magnet BL has associated therewith an electric switch $bl$ (only shown in the diagram according to FIG. 4) operable by armature 40.

The described line changer can be automatically controlled by the conveyed articles themselves. For this purpose the articles, say, when the goods are being packed into a box or a carton, are provided with labels on which the control orders for the line changer in the conveyor plant are printed in coded form so that reading of the labels by means of photo-electric devices can take place fully automatically. The code may consist of, say, four information elements "yes/no" which, altogether enable 16 different combinations for an equal number of control orders. According to the four information elements there are four photoelectric scanners, each comprising a light source 42 and a photocell 43, 44, 45 and 46 respectively, the arrangement being such that a light beam issuing from the light source enters the photocell only after reflection from the label, if the respective information element is "yes." According to the circuit diagram in FIG. 4, the photocells 43–46 scanning the information elements each lie in the exciter circuit of an associated relay F, G, H and J respectively, whose switches are designated $f_1$ and $f_2$, $g_1$–$g_3$, $h_1$–$h_4$ and $i_1$–$i_7$ respectively.

In order that the articles always take up the same definite position for automatic reading of the control orders, there are provided a guide rail 48 and a light-barrier with a light source 49 and a photocell 50. Said light barrier is so arranged that the light beam is always interrupted by the article on which the control order shall be read. Photocell 50 lies in the exciter circuit of the relay A (FIG. 4) with electric switches $a_1$–$a_3$.

Figure 4:
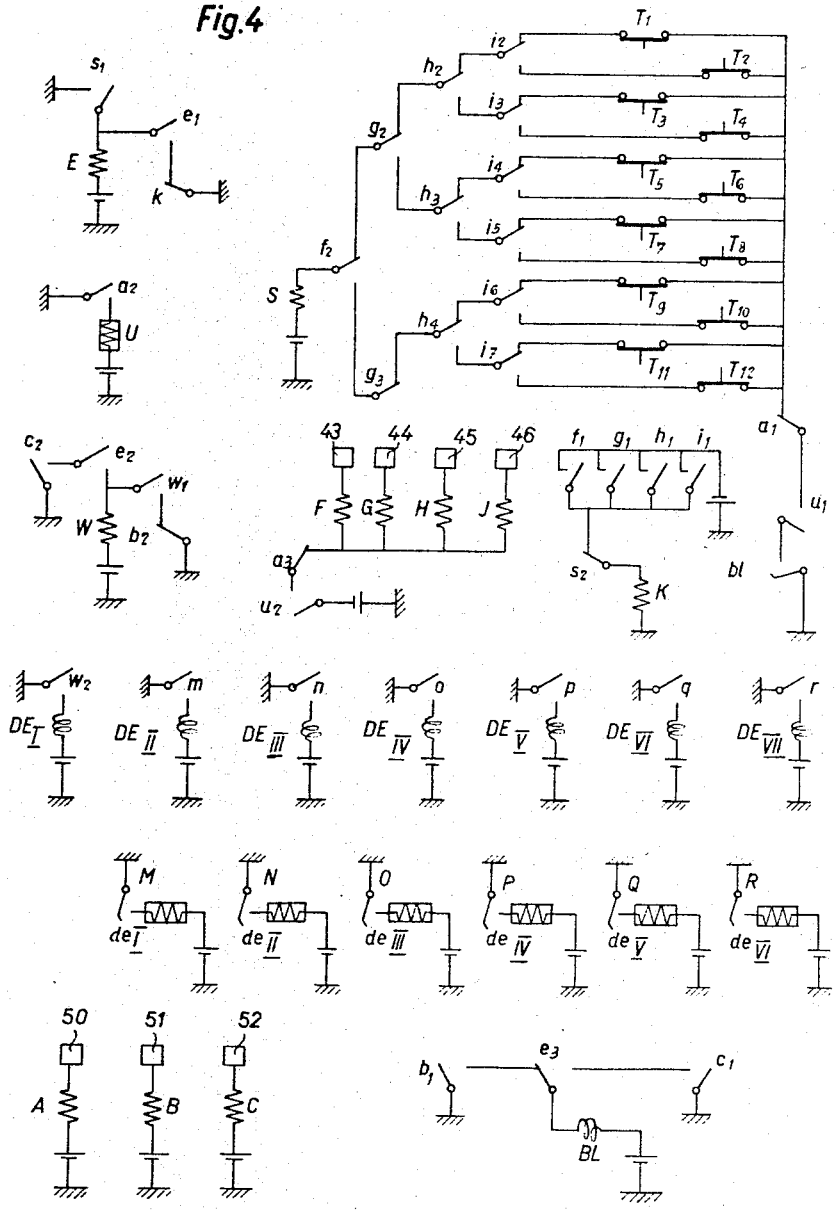
FIG. 4 is a circuit diagram of an electric device for controlling the line changer according to coded control orders to be attached to the articles themselves.

In each of the branched tracks there is also a light barrier. That of the curved track includes a photocell 51 which lies in the exciter circuit of a relay B (FIG. 4) having electric switches $b_1$ and $e_3$. The light barrier in the straight track includes a photocell 52 which lies in the exciter circuit of a relay C with electric switches $c_1$ and $c_2$ (FIG. 4). The light barrier with the photocell 51 is so arranged as to be unaffected by the articles travelling on the straight track. Similarly, the other light barrier with the photocell 52 is of such a design that it is unaffected by the articles travelling on the curved track.

In addition to said members, the electric circuit for the automatic control of the line changer also contains a relay E with electric switches $e_1$–$e_3$, a relay K with an electric switch $k$, a relay S with electric switches $s_1$ and $s_2$, a relay W with electric switches $w_1$ and $w_2$, a delayed-action relay U with switches $u_1$ and $u_2$ together with a number of delay-action relays M, N, O, P, Q and R each with an electric switch $m$, $n$, $o$, $p$, $q$ and $r$ respectively. Moreover, there is provided a set of hand-switches $T_1$–$T_{12}$ for selectively setting the opening program in order to evaluate the control orders.

The action of the described line changer is as follows:

In the starting position and the position of rest the tapered rollers 20–26 are lowered with respect to the cylindrical rollers 1–16 and 27–29 so that the line changer is set for transporting articles on the straight track. The photocell relays A, B and C are excited, for which reason the switches $a_2$, $b_1$, $c_1$ and $c_2$ are closed, and the switches $a_1$, $a_3$ and $b_2$ are opened. Consequently, magnet BL of the blocking device 37 and relay U are excited, so that the switches $u_1$ and $bl$ are closed. The photocell relay F, G, H and I are deenergized because no light falls onto the associated photocells 43–46 so long as there is no article positioned for reading the control order.

When an article travels towards the beginning of the line changer, the light beam of the photocell 50 is interrupted by the article, whereby the photocell relay A becomes deenergized and its switches $a_1$ and $a_3$ are closed, while switch $a_2$ opens. Relay U thereby becomes deenergized, but as it is of the delayed-action type its switches $u_1$ and $u_2$ will remain closed for a certain period of time, thus preparing the circuit to relay S and closing the circuit to photocell relays F, G, H and I.

By means of the photocells 43–46, the coded control order is read from the article, on whose label the light beams of the light sources 45 are reflected or not according to the existing control order. Thereby the associated photocell relays F, G, H and I are excited. If the scanned code does not agree with the operating program set on the hand-switches $T_1$–$T_{12}$, relay S does not become excited. In that case, the line changer remains in its position of rest, and the article will be conveyed over the cylindrical rollers 1–16 on the straight track.

If the code of the scanned control order demands the curved track and agrees with the opening program set on the hand-switches $T_1$–$T_{12}$, relay S is operated. Thereby switch $S_1$ is closed and relay E is operated which, through its switch $e_1$ and the break switch $k$ of relay K which becomes deenergized by opening switch $s_2$, closes a holding circuit. Subsequently, the switches $u_1$ and $u_2$ of the delayed-action relay U open, whereby relay S becomes deenergized, and the circuit of the photocell relays F, G, H and I is interrupted. Through switch $e_2$ the relay W is operated and its switch $w_2$ energizes the magnet $DE_I$. The latter raises the first tapered roller 20 into its working position, in which its topmost peripheral line lies a few millimeters higher than the topmost peripheral lines of the cylindrical rollers 1–16. Incidentally switch $de_1$ becomes closed and energizes the delayed-action relay M, whose switch $a$ energizes the magnet $DE_{II}$ after a time-lag thus causing the second tapered roller 21 to be raised into its working position. Thereby switch $de_{II}$ is closed and the time-lag relay N is operated and its switch $a$ energizes the magnet $DE_{III}$ thus causing the third roller 22 to be raised. In an entirely similar manner, by means of the relays O, P, Q, R the electromagnets $DE_{IV}$–$DE_{VII}$ are consecutively energized with time-lag and the associated rollers 23–26 raised into their working position. During this operation the article starts to pass along the curved track over the tapered rollers which are already raised into working position.

Should the article travel further than the scanning position of the control order, the relays E, W, M, N, O, P, Q, R and the magnets $DE_I$–$DE_{VII}$ remain energized at least up to the scanning of the control order or the succeeding article.

When another article reaches the beginning of the line changer, the light barrier 49, 50 initiates anew the scanning of the control order. If it again selects the curved track, relay S is picked up. Thereby relay E remains energized because the break switch $k$ of relay K remains closed, since its circuit has been interrupted by switch $s_2$. Therefore the line changer does not alter its position with respect to the previous one.

If, on the other hand, the control order of the succeeding article selects the straight track, relay S is not energized on the control order being scanned. Through at least one of the photocell relay switches $f_1$, $g_1$, $h_1$ and $i_1$, as well as the now closed switch $s_2$, the relay K is energized and its break switch $k$ opens the holding circuit of relay E so that the latter is deenergized. The now operating switch $e_2$ interrupts the circuit of relay W whose switch $w_2$, in turn, opens the circuit to magnet $DE_I$. As a result, the first tapered roller 20 lowers into its idle position, whereby switch $DE_I$ is opened and thus deenergizes relay M. Its switch $m$ opens with time-lag the circuit of magnet $DE_{II}$ so that also the second tapered rollers 21 is lowered into its idle position. Switch $DE_{II}$ thereby opens to interrupt the circuit of relay N whose switch $n$ opens to deenergize magnet $DE_{III}$, thus lowering the third roller. The described procedure continues in a similar way for the relays O, P, Q and R as well as for the magnets $DE_{IV}$–$DE_{VII}$ until all vertically movable rollers 20–26 have been lowered into their idle position. Consequently, the article will be transported over the cylindrical rollers 6–16 on the straight track.

For the sake of simplicity, the light barriers with the photocells 51 and 52 have been ignored in the method of operation hitherto disclosed.

If an article travelling on the straight track breaks the light beam to the photocell 52, the associated photocell relay C is deenergized and its switches $c_1$ and $c_2$ are opened, which at first has no effect. If the control order selecting the straight track is scanned on the immediately following article, relay E remains deenergized and magnet BL is energized through the switches $b_1$ and $e_3$.

If, however, the control order of an immediately following article selects the curved track, relay E is picked up and the circuit to magnet BL is opened through switch $e_3$. Incidentally the blocking device 37 is raised between the rollers 4 and 5 under the actions of the springs 41, and the following article is held by the blocking device and prevented from travelling on towards the beginning of the line changer. At the same time, the switch $bl$ opens the circuit of relay E so that it can no longer be energized. Moreover, the open switch $c_2$ prevents the circuit to relay W being closed on relay E being energized, so that the position of the line changer does not change. Thereby it is ensured that the following article neither reaches the incorrect track nor brings about the change in track as long as the preceding article is still in the range of both the cylindrical and the vertically movable tapered rollers. Not until the first article permits the light beam to reach the photocell 52, will photocell relay C be energized, whereupon switch $c_1$ closes the circuit of magnet BL, thus retracting the blocking device 37 from the path of the following article. In addition, switch $c_2$ now operates to energize relay W which, in turn, initiates the change in direction of the track.

The operations are similar if an article is on the curved track and breaks the light beam to photocell 51. Then photocell relay B is deenergized, its switch $b_1$ is opened and switch $b_2$ is closed. Through switch $b_2$ a holding circuit of relay W is closed, in order that the same can in no way be deenergized. If on an immediately following article the control order for the curved tracks is again read, no action is taken, and the article follows the first one over the line changer.

If, on the other hand, on an immediately following article, the control order selects the straight track, relay E becomes deenergized, and the circuit to magnet EL is interrupted by means of switch $e_3$ so that the blocking device is operated. Relay W remains deenergized over its holding circuit so that the rollers of the line changer cannot alter their positions. The switch $bl$, furthermore, opens the circuit to relay S. Not until the light beam to photocell 51 is again released through the first article, will the blocking device 37 retract from the path of the following article, and the holding circuit of relay W be opened through switch $b_2$, whereupon the line changer goes into its other position.

It is understood that the blocking device 37 can never operate if the distance between the articles is such that, at the moment of scanning a control order on an article, the one travelling ahead has already released photocell 51 or 52.

The minimum space as ensured by the blocking device between two succeeding articles which shall travel along different tracks, is comparatively small in the described line changer, inasmuch as the change in position of the line changer does not take place instantaneously, but stepwise from the entry side of the line changer by the substantially vertical movement of rollers 20–26 one after the other. In case that no change in position of the line changer shall take place between the successive articles, the space between the articles may even be smaller, since the blocking device 37 does not become operative anyway.

If the conveying speed of the articles is relatively high, the relays M–R may be designed without additional time-lag. Then the delay as caused by the normal operating time of the relays M–R and magnets $DE_I$ and $DE_{VIII}$ suffices in order to bring about consecutive movement of the rollers 20–26.

In modified forms (not shown) of the line changer, instead of photo-electric devices, other scanning or sensing devices may be provided which, say, work purely mechanically.

Actuating means for raising and lowering the vertically movable rollers 20–26 and the blocking device 37 may also be pneumatic, hydraulic or operate in any other way instead of electromechanically. If necessary, the rollers may be lowered by means of springs.

It is also understood to have the line changer designed in such a way that the spindles of the tapered rollers 20–26 are mounted in fixed bearings and, instead, those of the cylindrical rollers 5–12 made vertically movable. Further, the alternating rollers of both branched tracks might conceivably be movable in vertical direction and be each time operated in the reverse direction so that the rollers of one track be raised and the others lowered at the same time, whereby the movement of the rollers again takes place one after another successively from the beginning of the line changer.

Instead of a straight and a curved track, there may also be provided two tracks curved to different sides.

Alternatively, it is possible to have the line changer provided with a straight track, one curved to the left and one curved to the right. In this case, at the junction, three sets of rollers are provided, two of the sets being movable vertically, in order selectively to be raised into the working position or be lowered into the idle position.

The number of the vertically movable rollers may vary from case to case, according to the radius of curvature of one track and according to the weight and dimensions of the articles to be conveyed.

As contrasted to the described example of embodiment, the line changer according to the invention may also be designed for converging tracks. In that case, in each of the branch tracks there are provided a blocking device and scanning means for automatically scanning the control orders from the articles. The substantially vertically movable rollers are then consecutively raised or lowered as starting from the branched entry side of the line changer.

The main advantage of the line changer disclosed according to the invention is that the articles to be conveyed can follow each other relatively rapidly and can travel at a relatively high speed. Since, upon change in the track, the substantially vertically movable rollers alter their position consecutively, change-over of the line is carried out without haste and with greater certainty. It is no problem to build the line changer for transporting comparatively heavy articles of, say 50 kg., which follow each other at a rate of 90 pieces per minute.

What I claim is:

1. Automatic line changer for a roller-type conveyor for continuous conveying and sorting of articles, comprising branched tracks each having independent sets of rollers, the rollers of at least one of the sets being movable in a substantially vertical direction with respect to the rollers of the other set to be raised to an operative position or lowered to an inoperative position selectively, a number of actuating means corresponding with the number of vertically movable rollers, each of the actuating means being associated with one of the vertically movable rollers, and means for automatically controlling the actuating means whenever the conveying track is to be changed by raising or lowering the vertically movable rollers one after the other consecutively in the conveying direction of the articles.

2. Automatic line changer according to claim 1, in which the actuating means associated with the second and following rollers coming first into contact with the articles are automatically operated on the change in position of the adjacent roller in the set as the rollers are raised or lowered.

References Cited by the Examiner
UNITED STATES PATENTS

| | | | |
|---|---|---|---|
| 2,062,604 | 12/1936 | Paxton | 193—36 |
| 2,859,857 | 11/1958 | Cady | 198—33.2 |
| 3,034,634 | 5/1962 | Brand | 198—38 |
| 3,138,238 | 6/1964 | DeGood | 193—36 |

EVON C. BLUNK, *Primary Examiner.*

RICHARD E. AEGERTER, *Examiner.*